United States Patent

VanDyk et al.

Patent Number: 6,074,091
Date of Patent: Jun. 13, 2000

[54] SCAN MIRROR REMOTE TEMPERATURE SENSING SYSTEM AND METHOD

[75] Inventors: Steven G. VanDyk, Goleta, Calif.; Walter Balinski, Troy, Mich.; Ronald J. Choo, Los Angeles, Calif.; Paul E. Bortfeldt, Boulder, Colo.

[73] Assignee: Raytheon Company, Lexington, Mass.

[21] Appl. No.: 08/797,767

[22] Filed: Feb. 7, 1997

[51] Int. Cl.[7] .................................................. G01K 7/00
[52] U.S. Cl. ............................................................ 374/185
[58] Field of Search ..................................... 374/120, 121, 374/153, 185; 250/342, 347, 351

[56] References Cited

U.S. PATENT DOCUMENTS

| 3,742,231 | 6/1973 | Spielberger | 374/121 |
| 4,494,881 | 1/1985 | Everest | 374/120 |
| 5,641,958 | 6/1997 | Rudeen | 250/235 |
| 5,783,827 | 7/1998 | Fallon et al. | 250/347 |

Primary Examiner—G. Bradley Bennett
Assistant Examiner—Gail Verbitsky
Attorney, Agent, or Firm—William C. Schubert; Glenn H. Lenzen, Jr.

[57] ABSTRACT

A remote temperature sensing system (10) for a scanning mirror (7). The system (10) includes a sensor which detects heat radiated by the mirror and provides a signal in response thereto. In the illustrative implementation, the system (10) includes a thermistor mounted within a housing. The housing is contoured to maximize the receipt of thermal energy thereby. A mounting assembly maintains the thermistor a predetermined nonzero distance from the scanning mirror (7). The invention includes a shroud (12) mounted on the mirror (7) for shielding the thermistor and a support tube connected to the thermistor housing on a first end and to a base on the second end thereof. The support tube is adapted to remain stationary within the shroud as the scanning mirror and the shroud rotate due to the scanning of the mirror. Wires are connected to the thermistor on a first end thereof and are wrapped around the support tube. The wires include a length of electrically conductive material having a resistivity which has a low sensitivity to temperature variations. The sensor output is processed in a conventional manner to provide an output indicative of the temperature of the mirror.

20 Claims, 7 Drawing Sheets

FIG.8.
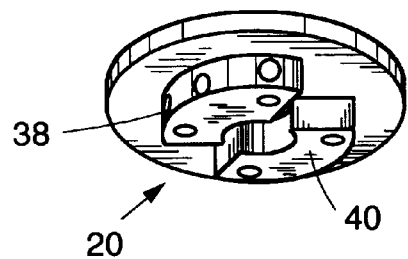
FIG.9.
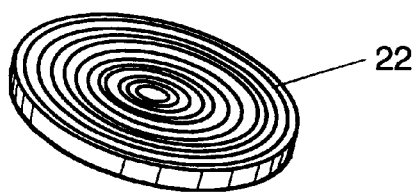
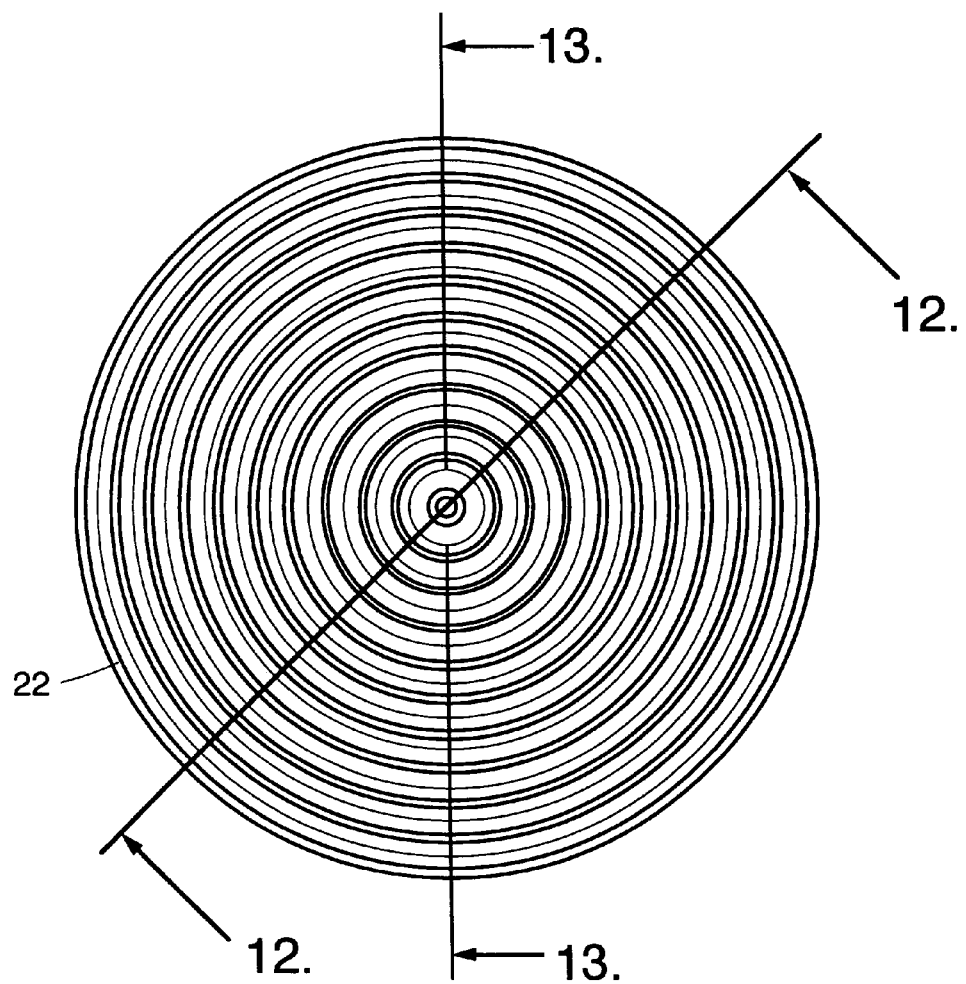
FIG. 10.

SCAN MIRROR REMOTE TEMPERATURE SENSING SYSTEM AND METHOD

The invention described herein was made in the performance of work under NASA Contract No. NAS5-30800 and is subject to the provisions of Section 305 of the National Aeronautics and Space Act of 1958 (72 Stat. 435; 42 USC 2457).

BACKGROUND OF THE INVENTION

1. Field of the Invention

The present invention relates to spacecraft instrumentation. More specifically, the present invention relates to systems and techniques for monitoring the temperature of scan mirrors used in connection with spacecraft instruments.

2. Description of the Related Art

Scan mirrors are often used in spacecraft to redirect energy received by the craft from a surface to an onboard sensor. The sensor is typically part of an instrument which generates data from the sensor readings. The data is stored, processed onboard and/or transmitted to earth for processing.

Some spacecraft components rotate for stabilization, scanning or other purposes. Scan mirrors on spacecraft in orbit around planetary and astral bodies near the sun experience temperature variations during rotation due to the effects of solar radiation and deep space. This causes distortions in images reflected by the mirror. Accurate knowledge of the mirror temperature is of paramount importance in calibrating data generated by the instrument under such circumstances.

An alternate approach for detecting the temperature of the mirror involves the location of a temperature sensor on the scanning mirror. This is only practical when the mirror oscillates instead of rotates as the extraction of electrical signals from the sensor is not possible inasmuch as any wires would experience a considerable amount of stress due to the scanning motion of the mirror.

To circumvent this problem, a radio transmitter has been used with the temperature sensor. However, this approach is costly, may impede the operation of the mirror and the radio signal may interfere with one or more of the instruments or other systems located on the spacecraft.

Hence, a need remains in the art for a low cost, effective system and/or technique for accurately measuring the temperature of a scanning mirror without interfering with the operation of the mirror or other instruments and systems on the spacecraft.

SUMMARY OF THE INVENTION

The need in the art is addressed by the remote temperature sensing system of the present invention. The inventive system is adapted for use with a scanning mirror and comprises a sensor which is maintained a predetermined nonzero distance from the scanning mirror. The sensor detects heat radiated by the mirror and provides a signal indicative thereof.

In the illustrative implementation, the system includes a thermistor mounted within a housing. The housing is contoured to maximize the receipt of thermal energy thereby. A mounting assembly maintains the thermistor in close proximity (e.g., one-tenth of an inch) to the scanning mirror. The invention includes a shroud mounted on the mirror for shielding the thermistor and a support tube connected to the thermistor housing on a first end and to a base on the second end thereof. The support tube is adapted to remain stationary within the shroud as the scanning mirror and the shroud rotate due to the scanning of the mirror. Wires are connected to the thermistor on a first end thereof and are wrapped around the support tube. The wires include a specific length of electrically conductive material, such as Manganin, having a resistivity which has a low sensitivity to temperature variations thereby enhancing overall system accuracy. The sensor output is processed in a conventional manner to provide an output indicative of the temperature of the mirror.

BRIEF DESCRIPTION OF THE DRAWINGS

FIG. 8 is a bottom perspective (isometric) view of the thermistor housing of the remote temperature sensing system of the present invention.

FIG. 9 is a top perspective (isometric) view showing the plate of the remote temperature sensing system of the present invention.

FIG. 10 is a top view of the plate of the remote temperature sensing system of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
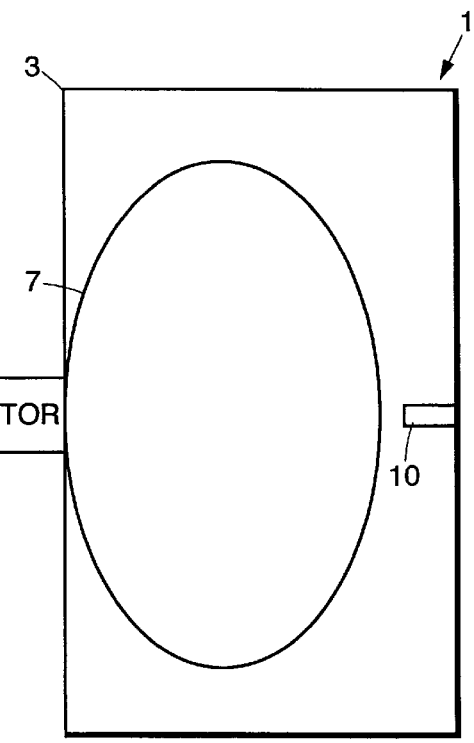
FIG. 1 is a simplified diagram of a scanning mirror arrangement incorporating the remote temperature sensing system of the present invention.

FIG. 1 is a simplified diagram of a scanning mirror arrangement incorporating the remote temperature sensing system of the present invention. As shown in FIG. 1, the arrangement 1 includes a mirror housing 3 which is conventionally implemented as a container constructed of metal, plastic or other suitable material. The mirror 7 is disposed within the housing 3. The mirror 7 is an oblong section of Beryllium with a reflective surface on both sides. Typical dimensions for a spacecraft scanning mirror are 22"×8"×2" in length, width and depth, respectively. A conventional motor 9 is mounted on one side of the mirror 7 at the axis of rotation thereof The motor 9 is secured to a left wall of the housing 3 and to the mirror 7. Diametrically opposed to the motor 9, at the axis of rotation of the mirror 7, is the inventive remote temperature sensing system 10 of the present invention. The system 10 is rigidly secured to a right wall of the housing 3 on one end and maintains a heat sensor a predetermined nonzero distance from the mirror 7 on the other. In the illustrative embodiment, the predetermined nonzero distance is 1/10 of an inch.

Figure 2:
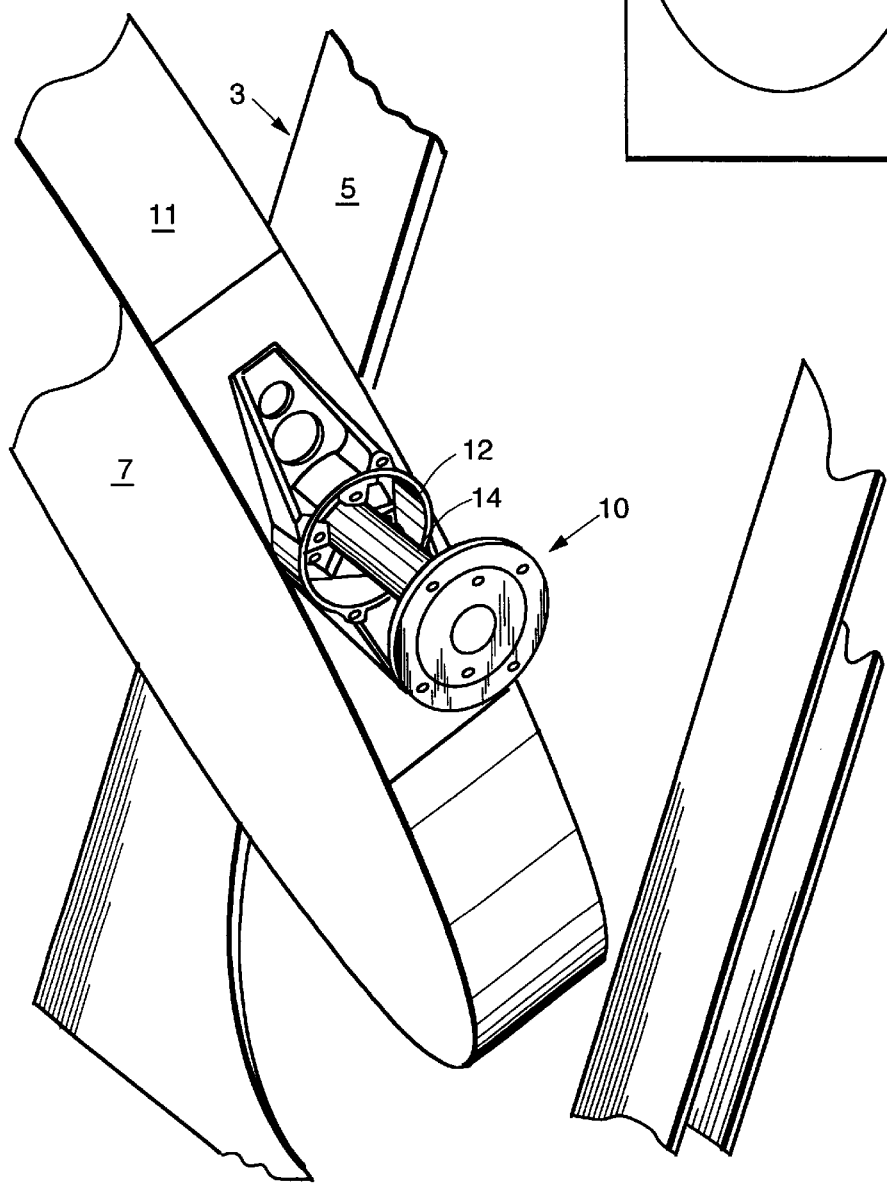
FIG. 2 is a magnified perspective view of a portion of the arrangement of FIG. 1 showing the scan mirror tilted and the remote temperature sensing system of the present invention in relation thereto.

FIG. 2 is a magnified perspective view of a portion of the arrangement of FIG. 1 showing the scan mirror tilted and the remote temperature sensing system of the present invention in relation thereto. As shown in FIG. 2, the system 10 includes a shroud 12 attached to the side 11 of the mirror 7. The shroud 12 is a cylinder of aluminum or other suitable thermally conductive material. The shroud is bolted to the mirror 7 and serves to protect a heat sensor, disposed therein, from stray thermal radiation. As discussed more fully below, the system 10 includes a heat sensor which is maintained a predetermined nonzero distance from the scan mirror 7 by an assembly 14 which mounts, at the base thereof, to a panel in a side of the housing 3. The shroud cover is not shown to reveal the manner by which the assembly 14 engages the shroud 12.

Figure 3:
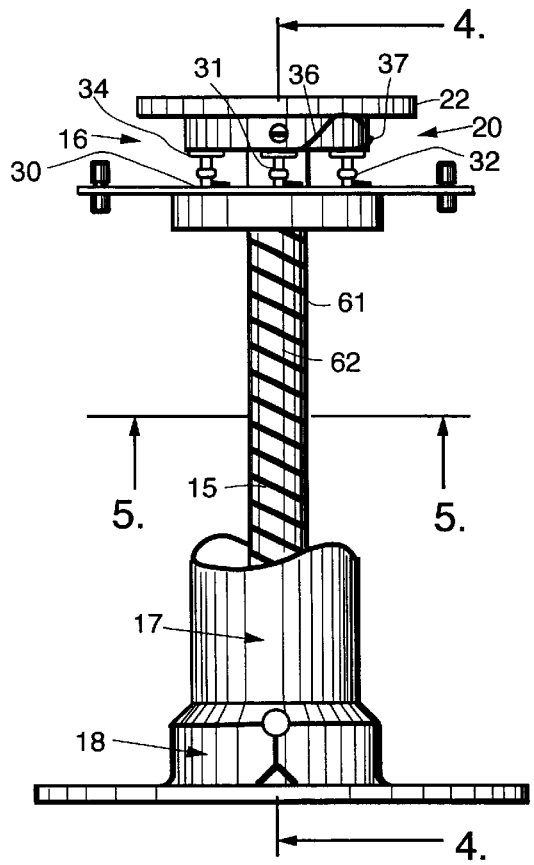
FIG. 3 is an elevated side view of the remote temperature sensing system of the present invention depicted without the shroud for clarity.
Figure 4:
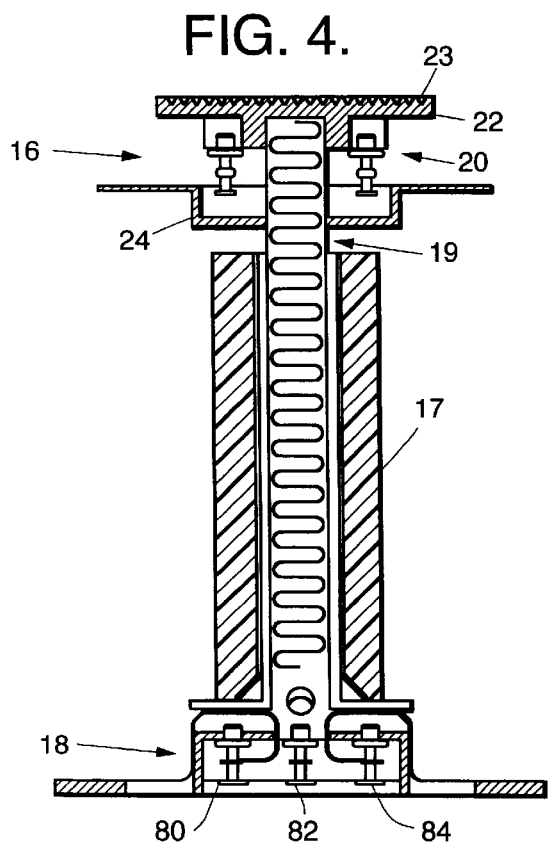
FIG. 4 is a sectional side view of the remote temperature sensing system taken along the line A—A of FIG. 3.

FIG. 3 is an elevated side view of the remote temperature sensing system of the present invention depicted without the shroud for clarity. FIG. 4 is a sectional side view of the remote temperature sensing system taken along the line A—A of FIG. 3. As shown in FIGS. 3 and 4, the assembly 14 has an upper portion 16 and a lower portion 18 connected by the support tube 15. The upper portion 16 includes a thermistor housing 20 and an end plate 22 disposed above the shroud cover 24. The mounting of thermistors within the thermistor housing 20 is best illustrated with respect to FIGS. 5–15 below.

Figure 5:
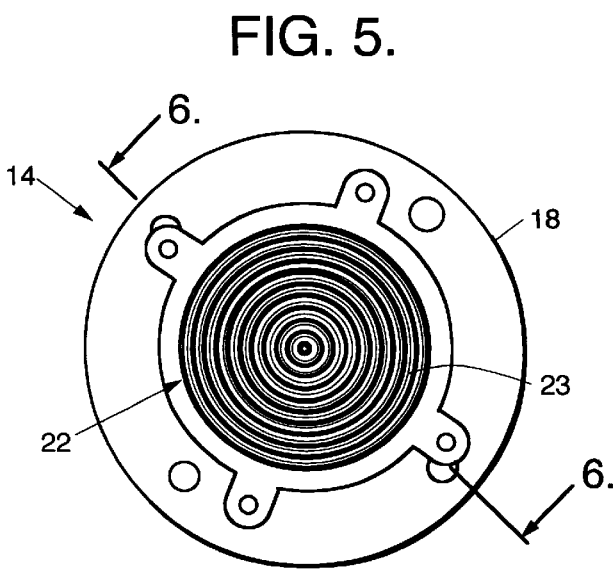
FIGS. 5 is a top view of the thermistor assembly of the remote temperature sensing system of the present invention.
Figure 6:
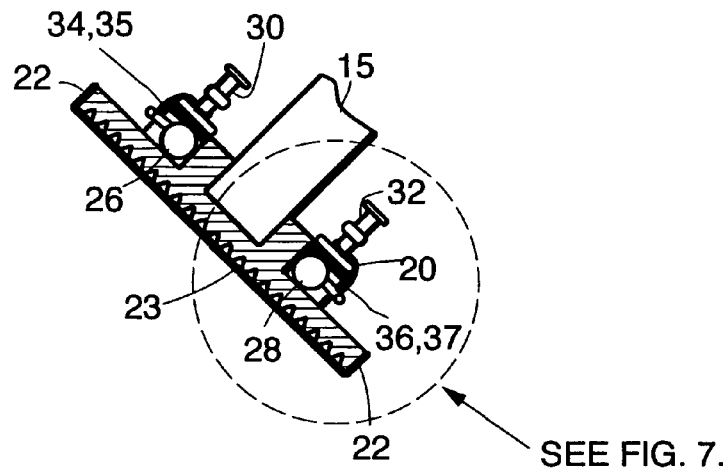
FIG. 6 is a sectional view of the plate and thermistor housing of the remote temperature sensing system of the present invention taken along the line B—B of FIG. 5.
Figure 7:
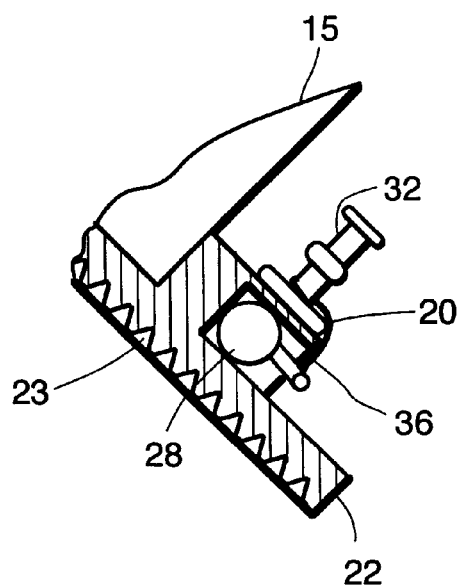
FIG. 7 is a magnified view of a section of the plate and thermistor housing of the remote temperature sensing system of FIG. 6.

FIGS. 5 is a top view of the assembly 14 of the remote temperature sensing system of the present invention. FIG. 6 is a sectional view of the plate and thermistor housing of the remote temperature sensing system of the present invention taken along the line B—B of FIG. 5. FIG. 7 is a magnified view of a section of the plate and thermistor housing of the remote temperature sensing system of FIG. 6. As illustrated in FIGS. 5–7, the plate 22 has a plurality of concentric, annular grooves 23 thereon on the surface which faces the scan mirror 7. In the illustrative embodiment, the grooves 23 are cut at 40° angles and serve to increase the surface area and thereby maximize the efficient reception of thermal energy radiated from the mirror 7.

The thermistor housing 20 is disposed on the back side of the plate 22 and integral therewith. The housing 20 and plate 22 are constructed of aluminum or other suitably thermally conductive material. As illustrated in FIG. 6, the thermistor housing 20 is adapted to retain two thermistors 26 and 28. The thermistors 26 and 28 are bonded into the housing with a suitable thermally conductive adhesive.

The thermistors 26 and 28 are of conventional design and construction and may be selected to suit a particular application and purchased from a number of companies such as Yellow Springs Inc. In the preferred embodiment, two thermistors are used. However, those skilled in the art will appreciate that the invention is not limited to the number of thermistors. Indeed, the number and nature of the thermal sensors may be varied without departing from the scope of the present teachings.

As shown in FIG. 6 and the magnified view of FIG. 7, each thermistor 26 and 28 is connected to two of the terminals 30–33 (31 and 33 not shown) by leads 34–37 (35 and 37 not shown. In the preferred embodiment, the terminals 30–33 are commercially available micro-terminals.

FIG. 8 is a bottom perspective (isometric) view of the thermistor housing of the remote temperature sensing system of the present invention.

FIG. 9 is a top perspective (isometric) view showing the plate of the remote temperature sensing system of the present invention.

FIG. 10 is a top view of the plate 22 of the remote temperature sensing system of the present invention.

Figure 11:
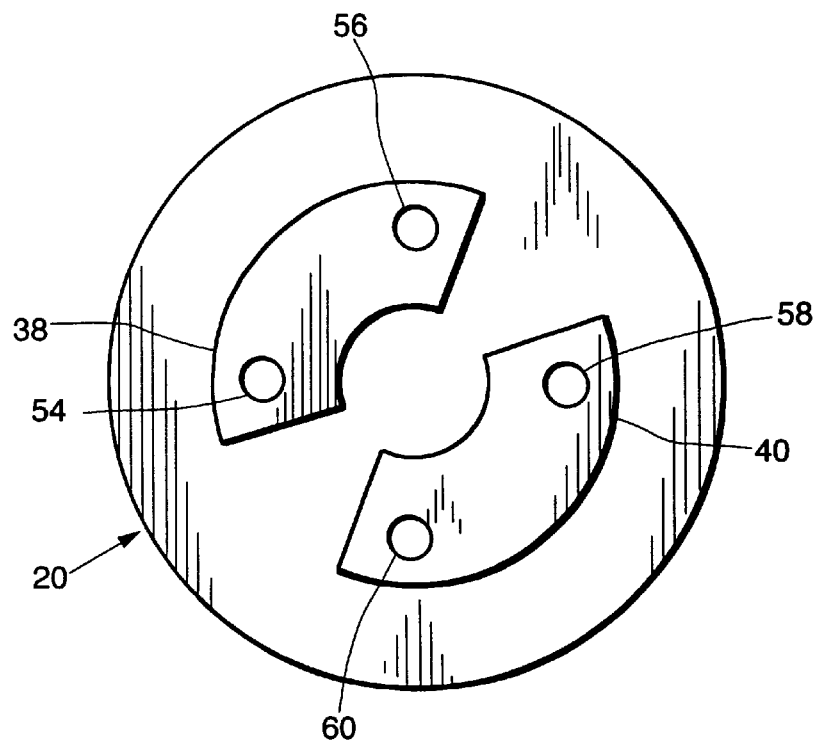
FIG. 11 is a bottom view of the thermistor housing of the remote sensing system of the present invention.

FIG. 11 is a bottom view of the thermistor housing 20 of the remote sensing system of the present invention.

Figure 12:
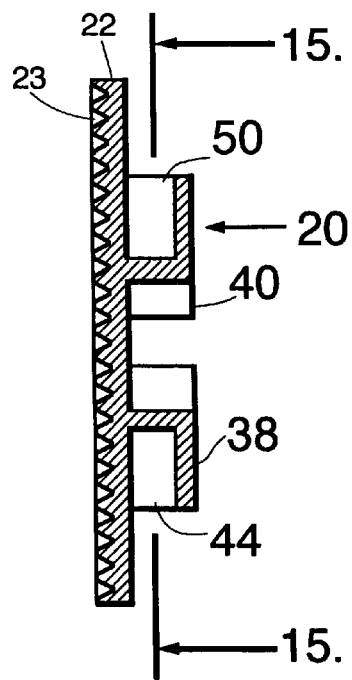
FIG. 12 is a sectional view of the thermistor housing of the remote sensing system of the present invention taken along the line B—B of FIG. 10.

FIG. 12 is a sectional view of the thermistor housing of the remote sensing system of the present invention taken along the line B—B of FIG. 10.

Figure 13:
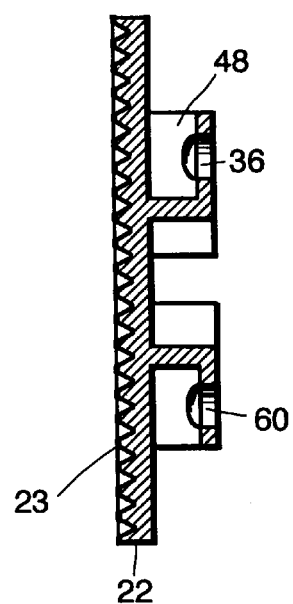
FIG. 13 is a sectional view of the thermistor housing of the remote sensing system of the present invention taken along the line A—A of FIG. 10.

FIG. 13 is a sectional view of the thermistor housing of the remote sensing system of the present invention taken along the line A—A of FIG. 10.

Figure 14:
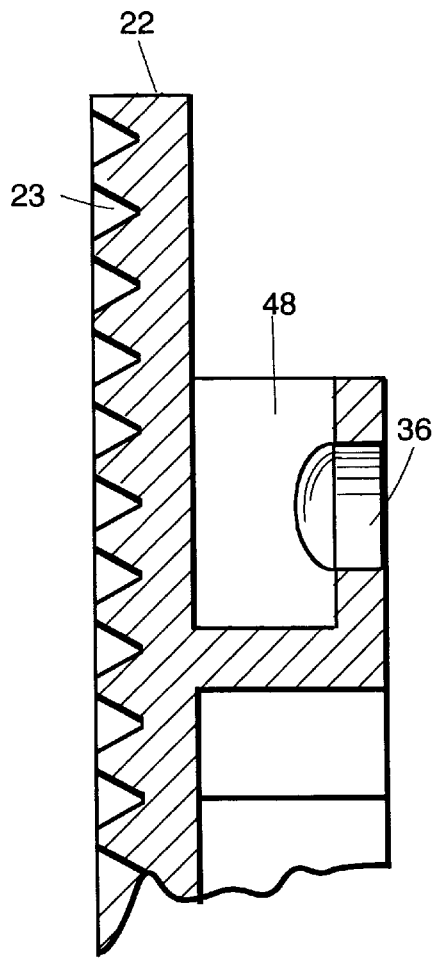
FIG. 14 is a magnified view of the upper portion of the thermistor housing depicted in FIG. 13.

FIG. 14 is a magnified view of the upper portion of the thermistor housing depicted in FIG. 13.

Figure 15:
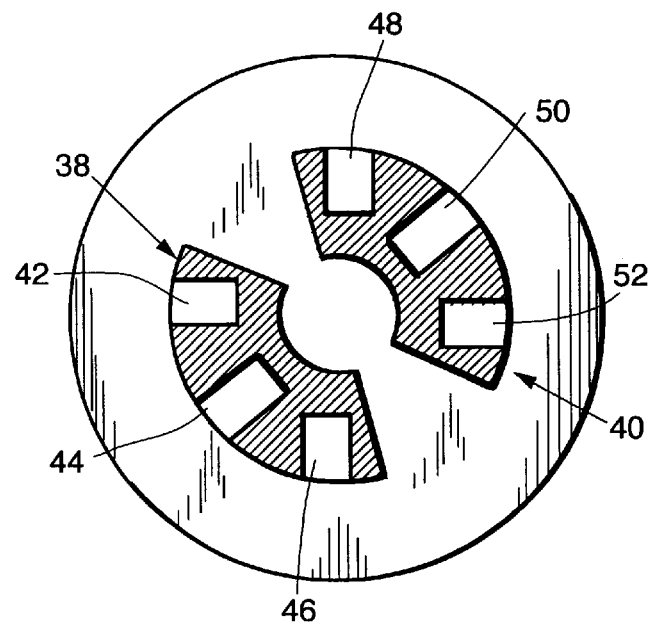
FIG. 15 is a sectional bottom view of the thermistor housing of the remote sensing system of the present invention taken along the line D—D of FIG. 12.

FIG. 15 is a sectional bottom view of the thermistor housing of the remote sensing system of the present invention taken along the line D—D of FIG. 12.

As depicted in FIGS. 8–15, the thermistor housing 20 includes first and second semi-circular sections 38 and 40 which house the thermistors 26 and 28 of FIG. 6. As best illustrated in FIG. 15, the first section 38 has plural recesses 42, 44 and 46. The second section 40 has recesses 48, 50 and 52. The recesses 44 and 50 serve to retain the thermistors while the recesses 42, 46, 48 and 52 serve to captivate the terminals 30–33. This is done by providing an area in which the insulated portion of the terminal, in this case teflon, can cold flow in the recesses 42, 46, 48 and 52 after insertion into 56, 60. The apertures 54, 56, 58 and 60 serve to receive the terminals 30–33 (not shown).

In the preferred embodiment, the plate 22 is 1/10th of an inch thick. Hence, the thermistors 26 and 28 are retained a predetermined nonzero distance from the mirror 7 to maximize the effectiveness thereof in sensing heat radiated by the mirror 7. The thermistor housing 20 is bonded to the support tube 15 with a suitable structural adhesive.

Returning to FIG. 3, a resistance measurement is taken from the thermistors 26 and 28 via wires 61–64 each of which is connected to a respective terminal 30–33. In the preferred embodiment, the wires 61–64 are strands of a conductive material, such as Manganin, which has a resistivity with a low sensitivity to temperature variations. The wires are wrapped around the support tube 15 as illustrated in FIG. 3. A layer of insulation 17 is wrapped around the support tube to protect against stray thermal radiation. The insulator 17 may be polyester or other suitable material separated by layers of reflective polyester mesh which further isolates each reflective insulator.

Figure 16:
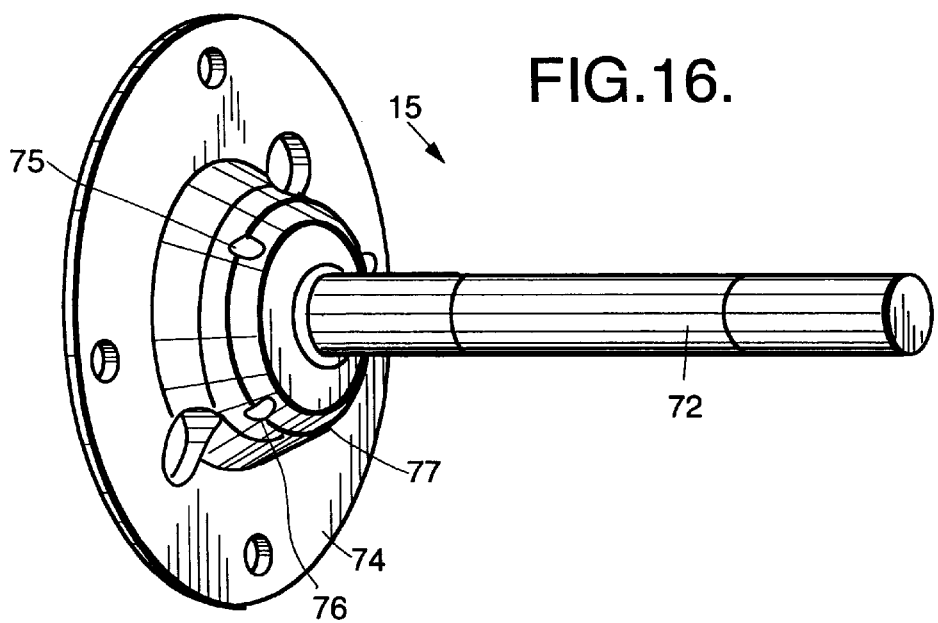
FIG. 16 is a perspective view of the support tube of the thermistor assembly of the remote temperature sensing system of the present invention.
Figure 17:
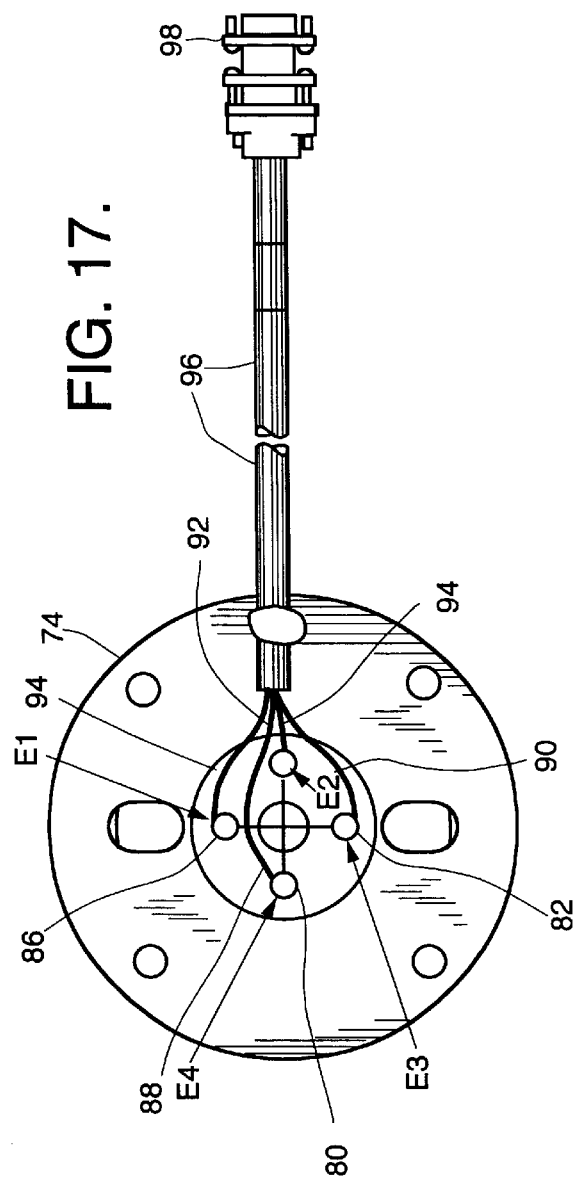
FIG. 17 is a bottom view of the base of the support tube showing terminals therein.

FIG. 16 is a perspective view of the support tube of the thermistor assembly of the remote temperature sensing system of the present invention. As shown in FIG. 16, the support tube 15 includes an elongate tube or cylinder 72 and a generally circular base 74. In the preferred embodiment, the support tube 15 is fabricated with a polycarbonate polymer construction such as Lexan$_{tm}$ which is a poor thermal conductor. The tube 72 may be sectional or a single unitary segment. The upper portion of the tube 72 seats in the thermistor housing 20 as depicted in FIGS. 4, 6 and 7. Returning to FIG. 16, channels 75–78 are provided in a dome shaped transition section 77 of the base 74. As illustrated in FIG. 4, the channels 75–78 allow the wires 61–64 to feed through the base 74 and connect with terminals 80–86 (even numbers only with 86 not shown in FIG. 4) which seat in the underside thereof FIG. 17 is a bottom view of the base 74 of the support tube 15 showing the terminals 80–86. Wires 88–94 (even numbers only) connect to the terminals 80–86, respectively. The wires are disposed within a sheath 96 which is terminated with a connector 98.

Figure 18:
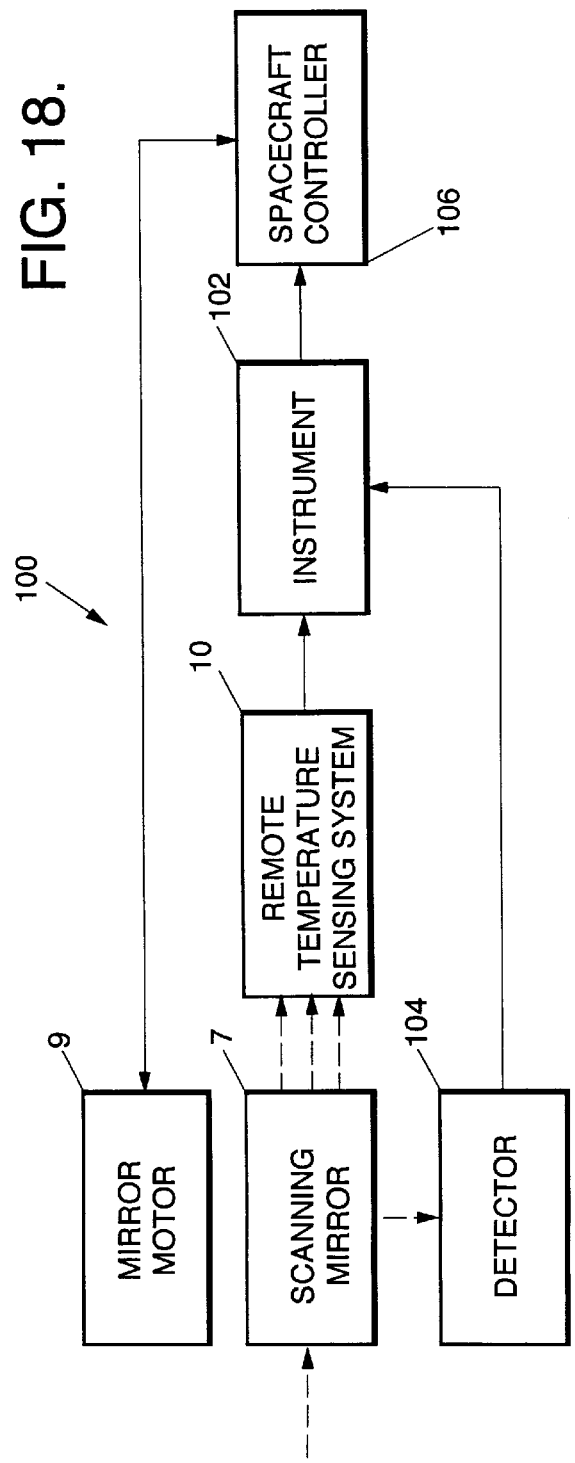
FIG. 18 is a block diagram of an illustrative electrical system utilizing the remote temperature sensing system of the present invention.

FIG. 18 is a block diagram of an illustrative electrical system utilizing the remote temperature sensing system of the present invention. As shown in FIG. 18, the system 100 includes the scanning mirror 7 which radiates heat to the remote temperature sensing system 10 of the present invention. The output of the sensing system 10 is used by an instrument 102 for calibration. After calibration, energy reflected by the mirror (shown dashed) is received by a detector 104. The output of the detector 104 is received by the instrument 102 and adjusted for the temperature of the mirror 7 as necessary. The scan of the mirror 7 is controlled by a spacecraft controller 106 via the motor 9. The output of the instrument 104 is input to a spacecraft controller 106 for transmission to a ground station.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A remote temperature sensing system for a scanning mirror comprising:
   first means for sensing temperature, said first means including a thermistor and
   second means for maintaining said sensor means at a predetermined nonzero distance from said scanning mirror to facilitate the sensing of the temperature of said scanning mirror by said first means, said second means including a shroud mounted on said mirror.

2. The remote temperature sensing system of claim 1 wherein said thermistor is mounted within said shroud.

3. The remote temperature sensing system of claim 2 wherein said thermistor is mounted within a housing.

4. The remote temperature sensing system of claim 3 wherein said housing is mounted within said shroud.

5. The remote temperature sensing system of claim 4 further including a support tube connected to said housing on a first end.

6. The remote temperature sensing system of claim 5 wherein said support tube is connected to a base on the second end thereof.

7. The remote temperature sensing system of claim 6 wherein said support tube is a polycarbonate with a narrowing cross section which provides for thermal isolation of the thermistor from outside influences.

8. The remote temperature sensing system of claim 5 further including wires connected to said thermistor on a first end thereof.

9. The remote temperature sensing system of claim 8 wherein said wires include a length of electrically conductive material having a resistivity which has a low sensitivity to temperature variations.

10. The remote temperature sensing system of claim 9 wherein said electrically conductive material is Manganin.

11. The remote temperature sensing system of claim 10 wherein said wires are wrapped around said support tube.

12. The remote temperature sensing system of claim 11 further including a layer of thermal insulation overlaying said wires around said support tube.

13. The remote temperature sensing system of claim 12 wherein said layer of thermal insulation is a blanket.

14. The remote temperature sensing system of claim 4 wherein said housing has a surface contoured to facilitate the receipt of thermal energy thereby.

15. The remote temperature sensing system of claim 14 wherein said surface has a plurality of grooves therein.

16. The invention of claim 1 further including means for processing a signal provided by said first means to provide an output indicative of the temperature of said mirror.

17. The invention of claim 1 wherein said second means maintains said first means one tenth of an inch from said scanning mirror.

18. A remote temperature sensing system for a scanning mirror comprising:
   a thermistor mounted within a housing and
   a mounting assembly for maintaining said thermistor at a predetermined nonzero distance from said scanning mirror to facilitate the sensing of the temperature of said scanning mirror by said thermistor, said mounting assembly including:
   a shroud mounted on said mirror for retaining said thermistor and
   a support tube connected to said housing on a first end and to a base on the second end thereof;
   wires connected to said thermistor on a first end thereof and being wrapped around said support tube; and
   means for processing a signal provided by said first means to provide an output indicative of the temperature of said mirror.

19. A method for remotely sensing the temperature of a scanning mirror including the steps of:
- providing a temperature sensor at a one-tenth of an inch from said scanning mirror to facilitate the sensing of the temperature of said scanning mirror by detecting heat radiated thereby and
- processing electrical signals received from said temperature sensor to ascertain the temperature of said scanning mirror.

20. A remote temperature sensing system for a scanning mirror comprising:
- first means for sensing temperature and
- second means for maintaining said sensor means approximately one tenth of an inch from said scanning mirror to facilitate the sensing of the temperature of said scanning mirror by said first means.

* * * * *